United States Patent
Costeux et al.

(10) Patent No.: US 10,967,367 B2
(45) Date of Patent: Apr. 6, 2021

(54) METHOD OF CLEANING RESINS

(71) Applicant: DOW GLOBAL TECHNOLOGIES LLC, Midland, MI (US)

(72) Inventors: Chunxia Costeux, Midland, MI (US); Liu Yang, Shanghai (CN); Chengli Zu, Midland, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 28 days.

(21) Appl. No.: 16/478,166

(22) PCT Filed: Feb. 10, 2017

(86) PCT No.: PCT/CN2017/073210
§ 371 (c)(1),
(2) Date: Jul. 16, 2019

(87) PCT Pub. No.: WO2018/145295
PCT Pub. Date: Aug. 16, 2018

(65) Prior Publication Data
US 2019/0366322 A1    Dec. 5, 2019

(51) Int. Cl.
| | | |
|---|---|---|
| B01J 49/60 | (2017.01) | |
| B01J 39/05 | (2017.01) | |
| B01J 49/53 | (2017.01) | |
| B01J 31/10 | (2006.01) | |
| B01J 35/00 | (2006.01) | |
| B01J 35/02 | (2006.01) | |
| B01J 39/18 | (2017.01) | |

(52) U.S. Cl.
CPC .............. B01J 49/60 (2017.01); B01J 31/10 (2013.01); B01J 35/0013 (2013.01); B01J 35/026 (2013.01); B01J 39/05 (2017.01); B01J 39/18 (2013.01); B01J 49/53 (2017.01)

(58) Field of Classification Search
CPC ... B01J 49/60; B01J 39/05; B01J 39/18; B01J 31/10; B01J 35/0013; B01J 35/026
USPC ........................................................... 521/26
See application file for complete search history.

(56) References Cited

U.S. PATENT DOCUMENTS

| | | | | |
|---|---|---|---|---|
| 4,496,667 A | * | 1/1985 | Reichgott | ................ B01J 49/60 521/26 |
| 6,248,797 B1 | * | 6/2001 | Dias | ........................ C08F 6/005 521/26 |
| 7,799,228 B2 | * | 9/2010 | Bornak | ...................... C02F 1/42 210/673 |
| 2008/0041789 A1 | * | 2/2008 | Bornak | .................... B01J 49/60 210/662 |

FOREIGN PATENT DOCUMENTS

| | | | |
|---|---|---|---|
| CA | 991945 A | | 6/1973 |
| CN | 103910822 A | * | 7/2014 |
| CN | 103910822 A | | 7/2014 |
| CN | 104017151 A | * | 9/2014 |
| CN | 104017151 A | | 9/2014 |
| JP | 2000290419 A | * | 1/2000 |
| JP | 2000290419 A | | 10/2000 |
| WO | 00/69559 A1 | | 11/2000 |
| WO | 2007/028034 A2 | | 3/2007 |

OTHER PUBLICATIONS

PCT International Search Report dated Nov. 16, 2017, for international application No. PCT/CN2017/073210, filed Feb. 10, 2017; ISA/CN, State Intellectual Property Office of the P.R. China, authorized officer, Chen, Xi.

* cited by examiner

*Primary Examiner* — Michael Bernshteyn
(74) *Attorney, Agent, or Firm* — Carl P. Hemenway; Kenneth Crimaldi

(57) ABSTRACT

Provided is a method of cleaning a collection of resin beads, wherein the method comprises bringing the collection of resin beads into contact with an aqueous solution, wherein the aqueous solution comprises one or more dissolved amine compounds, wherein the collection of resin beads comprises polymer that comprises attached carboxylic acid groups or sulfonic acid groups or a mixture thereof.

7 Claims, No Drawings

METHOD OF CLEANING RESINS

Resins are useful for a wide variety of purposes. Resins having attached acidic groups are useful, for example, as catalysts in acid-catalyzed chemical reactions. In one such acid-catalyzed reaction, one acetone molecule reacts with two phenol molecules to make one molecule of bisphenol-A ("BPA") and one molecule of water. BPA is often used as a raw material for making clear polymers, so that it is highly desirable that BPA is not contaminated with impurities that impart color. Therefore it is desirable that resins used as catalysts have very few impurities that are colored or that become colored during BPA production.

In some cases, impurities that are colored or that could become colored during BPA production are present in a resin as by-products of the resin manufacturing process. Such impurities could be present in very low amounts and could be inconsequential for most purposes, but they might contribute an undesirable amount of color to a BPA product. For example, if the resin has sulfonic acid groups, there may be a small amount of sulfur-containing compounds present in the resin that could be colored or could become colored. Therefore it is desirable to provide a method of cleaning a collection of resin beads after the manufacture of the resin beads to remove the impurities.

To assess the usefulness of a catalyst resin for a specific chemical reaction the conversion of the reaction and the selectivity of the reaction are judged. Of these, selectivity is especially important, because a high selectivity means that few by-products are produced and therefore the need for purification processes is reduced. Thus it is desired to provide an acid-functional resin that provides improved selectivity to a chemical reaction, for example the reaction that produces BPA.

Research Disclosure RD 369008 teaches a method of regenerating ion exchange resins such as sulfonated polystyrenes or styrene-divinylbenzene copolymers. RD 369008 teaches regeneration of resin after use of the resin as a catalyst for making BPA. RD 369008 teaches that, during BPA production, color bodies deposit in the pores of the resin and reduce its efficiency. RD 369008 teaches regenerating by a five-step washing process. The washing solutions taught by RD 369008 are as follows: a first water wash, a ketone solvent that optionally also contains water, an aqueous solution of a strong base (such as potassium or sodium hydroxide or potassium or sodium carbonate), an aqueous solution of strong acid, and a final water wash. It is desired to provide a method of cleaning a collection of resin beads after manufacture of the resin beads and before use as a catalyst, where the method has one or more of the following benefits: does not require wash with a ketone solution; does not require wash with an aqueous solution of a mineral base; does not require wash with an aqueous solution of a strong acid; removes colored impurities; improves the selectivity of the resin.

The following is a statement of the invention.

A first aspect of the present invention is a method of cleaning a collection of resin beads, wherein the method comprises bringing the collection of resin beads into contact with an aqueous solution, wherein the aqueous solution comprises one or more dissolved amine compounds, wherein the collection of resin beads comprises polymer that comprises attached carboxylic acid groups or sulfonic acid groups or a mixture thereof.

The following is a detailed description of the invention.

As used herein, the following terms have the designated definitions, unless the context clearly indicates otherwise.

As used herein, "resin" is synonymous with "polymer." "Polymer," as used herein, refers to relatively large molecules made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. A polymer has weight-average molecular weight of 2,000 or higher. A polymer that is sufficiently crosslinked that is insoluble in all solvents is considered to have infinite molecular weight.

Vinyl monomers have the structure (II)

where each of $R^{11}$, $R^{12}$, $R^{13}$, and $R^{14}$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers. Some vinyl monomers have one or more polymerizable carbon-carbon double bonds incorporated into one or more of $R^{11}$, $R^{12}$, $R^{13}$, and $R^{14}$, and such vinyl monomers are known herein as multifunctional vinyl monomers. Vinyl monomers with exactly one polymerizable carbon-carbon double bond are known herein as monofunctional vinyl monomers.

Styrenic monomers are vinyl monomers in which each of $R^{11}$, $R^{12}$, and $R^{13}$ is hydrogen or an unsubstituted alkyl and $R^{14}$ contains one or more substituted or unsubstituted aromatic ring.

A reaction among monomers to form one or more polymers is referred to herein as a polymerization process. The residue of a monomer after a polymerization process has taken place is known herein as a polymerized unit of that monomer.

Polymer beads are individual particles, each containing 50% or more by weight of polymer. Beads are in the solid state at 23° C. Beads have volume-average diameter of 10 µm or greater. If a particle is not spherical, the diameter of the particle is taken herein to be the diameter of an imaginary sphere that has the same volume as the particle.

As used herein, an organic compound is any compound that contains one or more carbon atom, with the exception of the following: binary compounds of carbon with exactly one other element other than hydrogen; metallic cyanides; metallic carbonyls; phosgene; carbonyl sulfide; metallic carbonates. An inorganic compound is a compound that is not organic. An organic group is a chemical group that contains one or more carbon atom, where one or more carbon atom in the organic group is covalently bonded to one or more atom outside of the organic group.

As used herein, an acid is a compound capable of donating a hydrogen ion to another compound. Strong acids have pKa of 6 or lower. A base is a compound capable of accepting a hydrogen ion or capable of donating a hydroxide ion to solution in water. Strong bases have pKa of the conjugate acid of 8 or higher.

As used herein, alkyl groups and alkenyl groups may be linear, branched, cyclic, or a combination thereof.

As used herein, a chemical group is said herein to be "substituted" if a substituent (that is, an atom or chemical group) is attached. Suitable substituents include, for example, alkyl groups, alkenyl groups, aryl groups, halogen atoms, nitrogen-containing groups including amine groups (including mono- and dialkylamine groups), oxygen-containing groups (including carboxyl groups and oxyalkyl groups), sulfur-containing groups (including sulfonic acid groups), nitrile groups, and combinations thereof.

As used herein, a heteroatom is an atom other than carbon and hydrogen.

A collection of particles is characterized by the volume-based distribution of diameters. The parameter D60 denotes the value of a diameter that has the property that exactly 60% of the collection of the particles, by volume, have diameter less than or equal to D60. The parameter D10 denotes the value of a diameter that has the property that exactly 10% of the collection of the particles, by volume, have diameter less than or equal to D10. The parameter "uniformity coefficient" (abbreviated "UC") is UC=D60/D10.

A collection of particles is also characterized by the harmonic mean diameter (HMD), which is defined as $$HMD = \frac{N}{\sum_{i=1}^{N} \left(\frac{1}{d_i}\right)}$$

Resin beads are said herein to have a sulfonic acid group if the sulfonic acid group is bonded to a carbon atom of the polymer. The sulfonic acid group may be in the hydrogen form or in an anionic form with an associated cation.

Resin beads may also be classified according to the porosity of the beads, which is measured on dried resin using the Brunauer-Emmett-Teller (BET) method using nitrogen gas. Macroreticular ("MR") resin beads have number-average pore diameter of 50 nm to 500 nm. Gel resin beads have much smaller pores than MR resin beads. The number-average pore diameter of gel resin beads is often too small to measure properly with the BET method. The number-average pore diameter of gel resin beads is considered to be less than 20 nm.

Ratios are characterized herein as follows. For example, when a ratio is said to be 3:1 or greater, that ratio may be 3:1 or 5:1 or 100:1 but may not be 2:1. To state this in a general way, when a ratio is said herein to be X:1 or greater, it is meant that the ratio is Y:1, where Y is greater than or equal to X. Similarly, for example, when a ratio is said to be 15:1 or less, that ratio may be 15:1 or 10:1 or 0.1:1 but may not be 20:1. To state this in a general way, when a ratio is said herein to be W:1 or less, it is meant that the ratio is Z:1, where Z is less than or equal to W.

The present invention is a composition that contains a collection of resin beads. Preferred resins contain polymerized units of one or more vinyl monomer. Preferably the amount of polymerized units of vinyl monomer in the resin is, by weight based on the weight of the resin, 95% or more; more preferably 99% or more.

Preferred resins contain polymerized units of one or more styrenic monomer. Preferred styrenic monomers are styrene, alkyl-substituted styrenes, divinylbenzene, and mixtures thereof; more preferred are styrene, divinylbenzene, and mixtures thereof. Preferably the amount of polymerized units of styrenic monomer in the resin is, by weight based on the weight of the resin, 50% or more; more preferably 75% or more; more preferably 85% or more; more preferably 95% or more; more preferably 99% or more.

Preferred resin beads are gel resin beads.

Preferably, the collection of resin beads has harmonic mean diameter of 100 μm or larger; more preferably 200 μm or larger; more preferably 400 μm or larger; more preferably 600 μm or larger. Preferably, the collection of resin beads has harmonic mean diameter of 2,000 μm or smaller, more preferably 1,500 μm or smaller. Preferably, the collection of resin beads has uniformity coefficient of 1.8 or smaller; more preferably 1.5 or smaller; 1.3 or smaller; more preferably 1.2 or smaller; more preferably 1.15 or smaller.

Preferably, the amount of polymerized units of multifunctional vinyl monomer is, by weight based on the weight of the resin, 0.5% or more; more preferably 1% or more; more preferably 1.5% or more. Preferably, the amount of polymerized units of multifunctional vinyl monomer is, by weight based on the weight of the resin, 15% or less; more preferably 10% or less; more preferably 8% or less; more preferably 6% or less. The preferred multifunctional vinyl monomer is divinylbenzene.

The resin may be characterized by the amount of sulfonic acid groups attached to the resin. Sulfonic acid groups are considered herein to contribute to this "amount" if they are attached to the resin and if the $SO_3$ group is intact. Thus, sulfonic acid groups contribute to this "amount" whether they are in hydrogenated form, in ionic form, ester form, in a complex with another chemical group, or some other form, as long as they are attached to the resin and the $SO_3$ groups are intact.

Preferably, the mole ratio of sulfonic acid groups attached to the resin to polymerized units of all monomers is 0.1:1 or greater; more preferably 0.2:1 or greater; more preferably 0.5:1 or greater; more preferably 0.75:1 or greater. Preferably, the mole ratio of sulfonic acid groups attached to the resin to polymerized units of all monomers is 2:1 or lower; more preferably 1.5:1 or lower; more preferably 1.3:1 or lower.

Preferably, the sulfonic acid groups are present in the resin at 0.3 mole per liter of resin (mol/L) or more; more preferably 0.4 mol/L or more; more preferably 0.5 mol/L or more; more preferably 0.6 mol/L or more. Preferably, the sulfonic acid groups are present in the resin at 4 mol/L or less; more preferably 3 mol/L or less; more preferably 2 mol/L or less.

The method of the present invention involves the use of an aqueous solution (herein "solution A") that comprises one or more amine compound. Preferred amine compounds have structure (I):

(I)

where each of $R^1$, $R^2$, and $R^3$ is independently hydrogen or an organic group. Preferably, each of $R^1$, $R^2$, and $R^3$ is independently hydrogen or an organic group having 1 to 30 carbon atoms; more preferably hydrogen or an organic group having 1 to 15 carbon atoms; more preferably hydrogen or an organic group having 1 to 8 carbon atoms; more preferably hydrogen or an organic group having 1 to 4 carbon atoms. $R^2$, and $R^3$ may be separate groups, or two or more of $R^1$, $R^2$, and $R^3$ may be bonded together to form a ring structure.

Preferably, $R^1$ is an organic group having 1 to 30 carbon atoms; more preferably $R^1$ and $R^2$ are both organic groups having 1 to 30 carbon atoms; more preferably $R^1$, $R^2$, and $R^3$ are all organic groups having 1 to 30 carbon atoms.

Preferably, one or more of $R^1$, $R^2$, and $R^3$ is an organic group that contains one or more heteroatom. Preferred heteroatoms are one or more oxygen atoms, one or more nitrogen atoms, and combinations thereof; more preferred is one or more oxygen atoms. Preferably, none of $R^1$, $R^2$, and $R^3$ contains any sulfur atom. When oxygen atoms are present, each oxygen atom is preferably either bonded to two carbon atoms or bonded to one carbon atom and one hydrogen atom.

Some preferred amine compounds are ammonia and structures (III) through (XI):

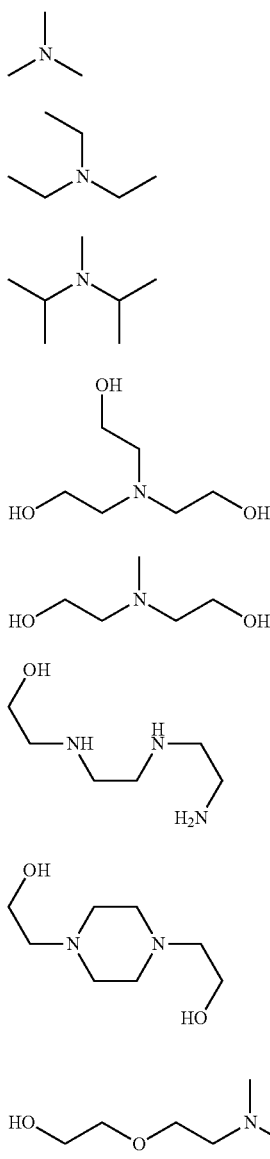

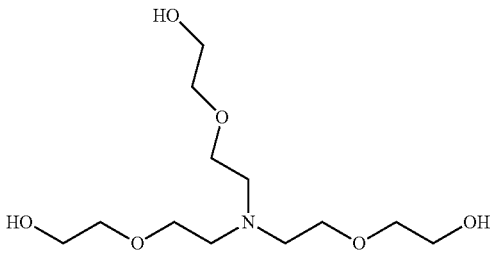

More preferred are structures (III) through (XI); more preferred is triethanolamine (structure (VI)).

Preferably one or more amine compounds is a base having pKa of the conjugate acid of 6 or higher; more preferably 7 or higher. Preferably one or more amine compounds is a base having pKa of the conjugate acid of 14 or lower; more preferably 12 or lower; more preferably 10 or lower.

Preferably one or more amine compounds has solubility in water at 20° C. of 1 g/L or higher; more preferably 3 g/L or higher; more preferably 10 g/L or higher; more preferably 30 g/L or higher; more preferably 100 g/L or higher.

The amine compound is present as a solute in an aqueous solution ("solution A"). Preferably the total amount of amine compounds in solution A is, by weight based on the weight of solution A, 0.01% or more; more preferably 0.03% or more; more preferably 0.1% or more; more preferably 0.2% or more; more preferably 0.5% or more; more preferably 1% or more. Preferably the total amount of amine compounds in solution A is, by weight based on the weight of solution A, 20% or less; more preferably 10% or less; more preferably 5% or less; more preferably 3% or less; more preferably 2% or less.

Preferably the sum of the amount of all amine compounds plus the amount of water in aqueous solution A is, by weight based on the weight of solution A, 80% or more; more preferably 90% or more; more preferably 95% or more; more preferably 98% or more; more preferably 99% or more.

In the method of the present invention, solution A is brought into contact with the collection of resin beads. Any method of bringing solution A and the resin beads into contact may be used. For example, the resin beads and solution A may both be placed in a container that has interior volume larger than the volume of the mixture of solution A with the collection of resin beads. In this example, the mixture of solution A and resin beads could be subjected to mechanical agitation for a contact time, for example by stirring.

In a preferred embodiment, a container (herein a "column") is used that has an inlet, an outlet, and a volume for holding the collection of resin beads. The column is configured to trap the resin beads inside the column, while liquid enters the column through the inlet, passes through the volume containing the resin beads, and exits the column through the outlet. Solution A may be used as the liquid, and it is contemplated that as solution A passes through the volume that contains the resin beads, solution A will make contact with the resin beads.

After solution A is brought into contact with the collection of resin beads, solution A is preferably then separated from the collection of resin beads. In the embodiment involving stirring a mixture of resin beads and solution A in a large volume, the separation could be accomplished by filtration or centrifugation. In the embodiment involving a column, the following cycle is preferably performed: introducing solution A to the column, then halting the introduction of fresh solution A into the column and holding solution A in the column in contact with the collection of resin beads for a contact time, and then allowing some or all of the remaining solution A to exit the column, for example by gravity. This cycle is preferably performed two or more times, each time using fresh solution A.

Preferred contact time is 10 minutes or more; more preferably 20 minutes or more; more preferably 30 minutes or more. Preferably, while solution A is in contact with the collection of resin beads, the temperature is 20° C. to 95° C.

The ratio of the total volume of solution A that is brought into contact with the collection of resin beads to the volume of the collection of resin beads (herein the "bed volume" or "BV") is 1:1 or higher; more preferably 2:1 or higher. The ratio of the total volume of solution A that is brought into contact with the collection of resin beads to the bed volume of the collection of resin beads is 10:1 or lower; more preferably 7:1 or lower; more preferably 4:1 or lower.

Preferably, after the collection of resin beads has been brought into contact with solution A and then separated from solution A, the collection of resin beads is then brought into contact with solution B. Preferably the amount of water in solution B, by weight based on the weight of solution B, is 98% or more; more preferably 99% or more; more preferably 99.5% or more. Preferably solution B is deionized water. Preferably the conductivity of solution B is 20 microsiemens/cm or less at 25° C. Preferably the pH of solution B is 6 to 8; more preferably 6.5 to 7.5.

Preferably, the collection of resin beads is not brought into contact with any solution that contains dissolved inorganic base at a concentration of 0.1% or more by weight based on the weight of the solution. Preferably, the collection of resin beads is not brought into contact with any solution that contains dissolved strong acid at a concentration of 0.1% or more by weight based on the weight of the solution.

It is contemplated that the cleaning process of the present invention is performed after the process of manufacturing the resin beads is complete. For example, resin beads having attached sulfonic acid groups may be manufactured by a process that includes making beads of a styrene/divinylbenzene copolymer. Those copolymer beads may be brought into contact with a sulfuric acid solution to cause a chemical reaction that attaches sulfonic acid groups to the copolymer. Such a contact with sulfuric acid solution is considered herein to be part of the manufacturing process and not a step in the cleaning process of the present invention. Similarly, other processes and solutions that are used in manufacturing the collection of resin beads are considered herein to be steps in the manufacturing process and are not steps in the cleaning process of the present invention.

One suitable use of the collection of resin beads, after it has been cleaned by the method of the present invention, is as a catalyst for making BPA. Sometimes, after the resin beads have been washed, a promoter is deposited on the resin beads to improve their effectiveness as a catalyst. Typical promoters have a thiol group, and many promoters have, in addition to a thiol group, an active group, such as an amine group, to bind to the catalyst resin. A commonly used promoter is 2,2-dimethylthiazolidine ("DMT"), which can convert during use to cysteamine. Promoter is typically deposited onto the resin beads by dissolving the promoter in a solvent to make a solution, bringing that solution into contact with the resin beads for a time, and then removing the solution, leaving some of the promoter deposited on the resin. Such a process of depositing a promoter onto a collection of resin beads is considered to be a separate operation from the washing process of the present invention.

During the production of BPA, the resin beads will be brought into contact with a reactant solution that contains acetone and phenol in a molar ratio of acetone to phenol of from 1:1 to 1:15. It is preferred that, prior to contact with such a reactant solution, the collection of resin beads is not brought into contact with any solution that contains a total amount of organic compounds of 20% to 100%, by weight based on the weight of the solution.

The following are examples of the present invention.
Materials and abbreviations used were as follows:
Resin1=AMBERLYST™ 131 resin (The Dow Chemical Company), sulfonic acid functional resin beads, hydrogen form, 1.35 eq/L acid sites, harmonic mean size 700 to 800 μm, uniformity coefficient ≤1.15.
TEA=triethanolamine
DIW=deionized water, conductivity ≤1 microseimens/cm
RT=room temperature, approximately 23° C.
TOC=total organic carbon
μs=microsiemens The "shake test" was performed on resin samples as follows. One part by weight of resin was mixed with 3 parts by weight of DIW and shaken for 20 minutes. The resin was filtered out of the resulting mixture, and the remaining solution was tested at RT for TOC, pH and conductivity. pH was measured with a pH meter. Conductivity was measured with an Expanded Range Conductivity Meter #23226-523 (VWR International). TOC was measured with a Sievers 900 Portable Total Organic Carbon analyzer (GE Water & Process Technologies Analytical Instruments).

EXAMPLE 1: CONCENTRATIONS OF AMINE COMPOUND

Washing of the resin was accomplished as follows. A glass chromatography column equipped with circulated-water heating jacket was installed vertically. The water in the jacket was circulated and brought up to 75° C. Then 100 mL of resin was loaded into the column (i.e., bed volume "BV"=100 mL). Then 5 BV of Test Wash solution was passed through the column at 1.2 BV/hr. Then the heating jacket was returned to RT, and 1.4 BV of DIW was passed through the column at 4 BV/hr. The resin was siphoned dry and stored in glass bottles for 7 days, and then tested by the shake test.

Five Test Wash solutions were prepared of TEA in deionized water. Concentrations were, by weight, 0.2%, 1%, 2%, 3%, and 5%. Results were as follows:

TABLE 1

Concentrations of Amine Compound

| TEA % | Conductivity (μs/cm) | pH | TOC (ppm) |
|---|---|---|---|
| 0 | 19 | 4.26 | 7.11 |
| 0.2 | 14 | 4.3 | 4.8 |
| 1 | 11 | 4.45 | 2.89 |
| 2 | 5.95 | 5.32 | 3.1 |
| 3 | 4.88 | 5.47 | 3.76 |
| 5 | 4.23 | 6.03 | 5.53 |

The conductivity and pH results show that the higher the concentration of TEA, the better the result. The TOC results show that 1% to 2% TEA is optimum.

EXAMPLE 2: LONGER STORAGE

Washing of the resin was accomplished as follows. A glass chromatography column equipped with circulated-water heating jacket was installed vertically. The water in the jacket was circulated and brought up to test temperature ("temp") (either RT or 90° C.). Then 100 mL of resin was loaded into the column (i.e., bed volume "BV"=100 mL). Then 1.2 BV of "Test Wash" solution (either DIW or 1.5% TEA by weight dissolved in DIW) was loaded onto the column and held for 30 minutes. Then the Test Wash solution was drained from the column. Then the heating jacket was set at RT, and 1.4 BV of DIW was passed through the column at 4 BV/hr. The resin was siphoned dry and stored in glass bottles for either 13 days or 60 days, and then tested by the shake test. Results were as follows:

TABLE 2

Results after 13 days storage

| Test Wash | Test temp | Conductivity (μm/cm) | pH | TOC (ppm) |
|---|---|---|---|---|
| DIW | RT | 66 | 3.82 | 24.9 |
| DIW | 90° C. | 58.1 | 3.89 | 19.2 |
| 1.5% TEA | RT | 49.5 | 3.95 | 19.2 |
| 1.5% TEA | 90° C. | 27.2 | 4.16 | 12.8 |

TABLE 3

Results after 60 days storage

| Test Wash | Test temp | Conductivity (μm/cm) | pH | TOC (ppm) |
|---|---|---|---|---|
| DIW | RT | 992 | 2.66 | 231 |
| DIW | 90° C. | 950 | 2.7 | 234 |
| 1.5% TEA | RT | 429 | 3.01 | 124 |
| 1.5% TEA | 90° C. | 301 | 3.15 | 97.8 |

For a given storage duration and a test temperature, in every case the TEA-washed sample had better conductivity, better pH, and better TOC than the corresponding DIW-washed sample.

Additionally, the samples in Table 3 were observed by eye. The two TEA-washed samples are noticeably lighter in color than the DIW-washed samples.

EXAMPLE 3: CATALYST FOR BPA PRODUCTION

Washing of the resin was accomplished as follows. A glass chromatography column equipped with circulated-water heating jacket was installed vertically. The water in the jacket was circulated and brought up to test temperature (either RT or 90° C.). Then 100 mL of resin was loaded into the column (i.e., bed volume "BV"=100 mL). Then 1.2 BV of "Test Wash" solution (either DIW or 1.5% TEA by weight dissolved in DIW) was loaded onto the column and held for 40 minutes, and the Test Wash solution was drained from the column. Then a fresh 1.2 BV of the same type of Test Wash solution was loaded onto the column and held for 40 minutes, and the Test Wash solution was drained from the column. Then the heated water was drained from the heating jacket, returning the column to RT, and 1.4 BV of DIW was passed through the column at 4 BV/hr.

To improve performance as a catalyst, the resin was loaded with a "promoter," 2,2-dimethylthiazolidine ("DMT"), as follows. The washed resin was placed in a round-bottom flask with sufficient DIW to make a slurry. 1.71 g. of DMT was dissolved in 10 mL of DIW to make a solution, and the solution was added dropwise to the slurry under stirring. Stirring continued for 1 hour. The liquid was removed by filtration, and the resin returned to the column. The resin was then washed with 5 BV of DIW at 2 BV/hour. Resin was transferred out of the column, surface water was removed by vacuum, and the resin was packed into a plastic bottle.

Reaction to make BPA was performed as follows. Resin was dried overnight at 90° C. In a round-bottom flask in a water bath at 70° C., 3 g of dried resin were placed into the flask, along with 28.8 g of phenol. After stirring for 1 hour, 1.2 g of acetone was quickly added to the flask. The liquid reaction mixture was sampled and analyzed by gas chromatography for acetone content and BPA content after 0.5 hr, 1 hr, 2 hr, 3 hr, and 4 hr.

Conversion and selectivity were assessed as follows:

$$\text{Conversion}=100\times(PI-PF)/PI$$

$$\text{Selectivity}=100\times B/(PI-PF)$$

where PI=initial moles of acetone, PF=final moles of acetone, and B=moles of para-, para-BPA produced.

Results were as follows:

| | DIW wash at 90° C. | | TEA wash at RT | | TEA wash at 90° C. | |
|---|---|---|---|---|---|---|
| Time (min) | Conversion (%) | Selectivity (%) | Conversion (%) | Selectivity (%) | Conversion (%) | Selectivity (%) |
| 30 | 39.69 | 95.90 | 19.56 | 96.58 | 8.60 | 96.33 |
| 60 | 61.44 | 95.85 | 39.44 | 96.62 | 16.59 | 96.58 |
| 120 | 65.96 | 95.76 | 52.74 | 96.42 | 32.36 | 96.40 |
| 180 | 84.54 | 95.64 | 68.17 | 96.28 | 53.57 | 96.35 |
| 240 | 83.33 | 95.58 | 73.06 | 96.13 | 57.60 | 96.22 |

The resins that were washed with TEA solution showed acceptable conversion and improved selectivity over the DIW-washed resin.

Also, the solution in the flask was inspected by eye at the end of the reaction. The DIW sample was darkest; the sample washed in TEA solution at 90° C. was noticeably lighter, and the sample washed in TEA solution at RT was lighter still.

The invention claimed is:
1. A method of cleaning a collection of resin beads, wherein the method comprises bringing the collection of resin beads into contact with an aqueous solution, wherein the aqueous solution comprises one or more dissolved amine compounds, wherein the collection of resin beads comprises polymer that comprises attached carboxylic acid groups or sulfonic acid groups or a mixture thereof.

2. The method of claim 1, wherein the amine compound has the structure (I)

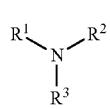
(I)

wherein $R^1$ is an organic group comprising 1 to 30 carbon atoms; wherein each of $R^2$ and $R^3$ is independently either hydrogen or an organic group comprising 1 to 30 carbon atoms.

3. The method of claim 2, wherein $R^1$ additionally comprises one or more atom of oxygen, one or more atom of nitrogen, or a combination thereof.

4. The method of claim 1, wherein the amine compound is present in the aqueous solution at a concentration of 0.1% to 6% by weight based on the weight of the aqueous solution.

5. The method of claim 1, wherein the amine compound has a pKa of the conjugate acid of 6 to 10.

6. The method of claim 1, wherein the polymer comprises attached sulfonic acid groups.

7. The method of claim 1, wherein the collection of resin beads comprises gel resin beads.

\* \* \* \* \*